Aug. 20, 1968  K. V. DIPROSE  3,398,283
LINE FOLLOWER HAVING ASYMMETRICAL SCANNING PATTERN
AND MEANS FOR INVERTING THE SCANNING DISPLAY
Filed July 13, 1965  3 Sheets-Sheet 1
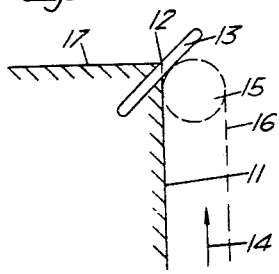
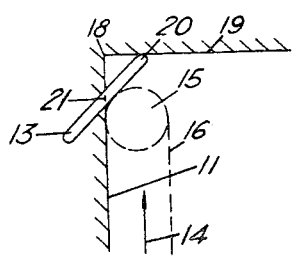
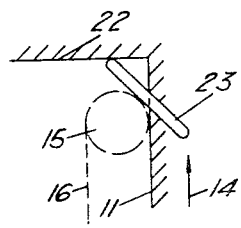
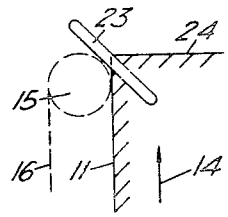
*Inventor*
KENNETH V. DIPROSE
By *Imirie & Smiley*
*Attorneys*

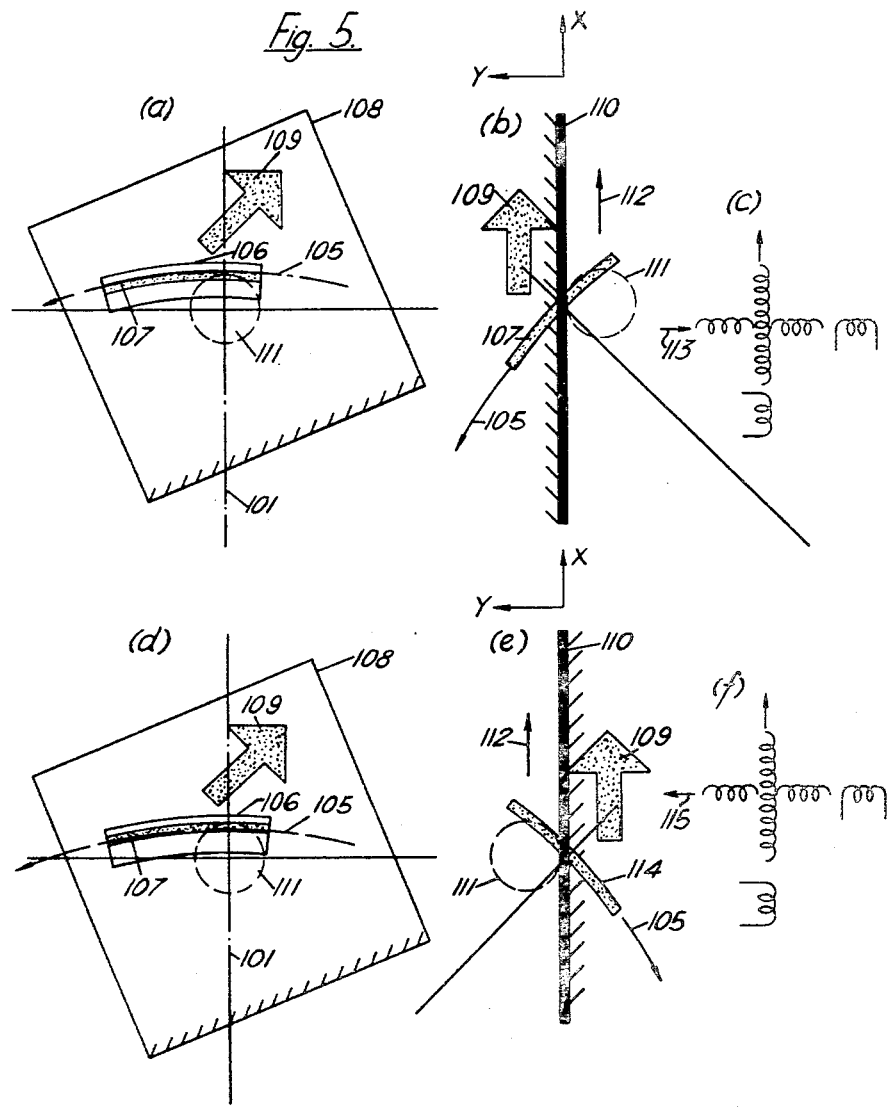

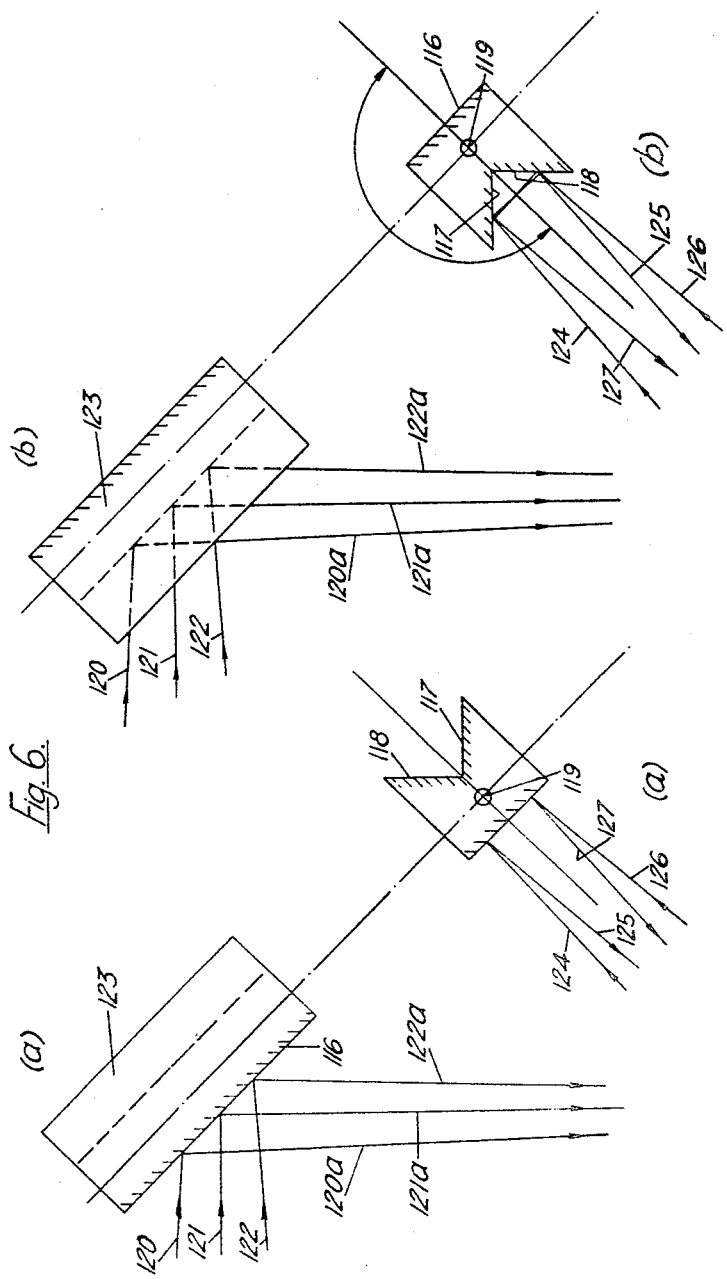

United States Patent Office 3,398,283
Patented Aug. 20, 1968

3,398,283
LINE FOLLOWER HAVING ASYMMETRICAL SCANNING PATTERN AND MEANS FOR INVERTING THE SCANNING DISPLAY
Kenneth V. Diprose, Westbury-on-Trym, Bristol, England, assignor to Hancock & Co. (Engineers) Limited, Croydon, England, a British company
Filed July 13, 1965, Ser. No. 471,681
Claims priority, application Great Britain, July 22, 1964, 29,602/64
7 Claims. (Cl. 250—202)

ABSTRACT OF THE DISCLOSURE

A photoelectric line follower producing a scanning pattern which is asymmetrical with respect to the outline to compensate for the asymmetrical placing of the tool (on one side) with respect to the outline, with an arrangement of movable reflecting surfaces in the path of the light rays forming the display which may be placed in one position when the tool is placed to one side with respect to the outline and moved to another position to invert the scanning display with respect to the outline when the tool is placed to the other side with respect to the outline.

---

This invention relates to line following heads as used for automatically following an outline on a substrate, and more particularly to a line following head including optical means to invert the scanning pattern as seen by the photoelectric device inside the head.

Line following devices for automatically following an outline on a substrate are used for various purposes, particularly for cutting workpieces in the form of steel plates to a shape defined by an outline by means of an oxygen jet cutting machine. While the invention is clearly usable for other purposes it will be described particularly in connecton with oxygen jet cutting machines.

In conventional line following devices either a spot of light or a tiny field of view, as seen by a photoelectric device, is oscillated across the outline being followed, the oscillation being in a direction normal to the outline, so that the scanning pattern is symmetrical with respect to the outline, and means are provided such that if the amount of illumination seen on the two sides of the outline is equal the follower continues to move in a straight line and will follow a straight outline. If the outline should deviate from the straight line the follower immediately sees more light on one side of the outline than on the other, and it develops a steering signal which steers the follower so that it continues to follow the deviated outline. The oxygen jet cutter in the machine precisely follows the movements of the follower head, either by being fixed to the same carriage or by being driven through a transmission system which exactly repeats the follower movements.

While the follower precisely follows the outline, the oxygen jet cutter (or any other kind of tool being used with a line follower) must operate on one side. If it is imagined that the cutter is following a notional outline on the workpiece which corresponds exactly with the actual outline on the substrate, the cutter must work to one side of the notional outline so that all the material which is cut away is cut from the waste side of the notional outline. In the case of an oxygen jet flame of circular cross-section, the cutter is offset to the waste side of the outline by one-half the diameter of the flame. In other words, the tool is asymmetrically placed with respect to the outline. The conventional type of line follower, which is of comparatively simple and robust form, is subject to certain inherent errors and these are a maximum when turning a sharp corner. Due to the asymmetrical placing of the tool, while using a symmetrical scanning pattern, these errors are quite different when turning an outside corner to what they are when turning an inside or re-entrant corner.

In co-pending patent application No. 407,395 there is disclosed a line follower and a method of line following in which an asymmetrical scanning pattern is used, that is to say, a scanning pattern which is not symmetrical about the outline, so arranged as to compensate for the asymmetrical placing of the tool with respect to the notional outline. However, this asymmetrical placing of the scanning pattern is related to the side of the notional outline upon which the tool is placed. That is to say, if the tool is arranged to cut on one side of a notional outline then the asymmetry of the pattern must be arranged in one way and if the tool is changed over so that it operates on the other side of the notional outline then the asymmetry of the scanning pattern must also be reversed.

One object of the invention is to provide convenient means for easily and quickly inverting the scanning pattern so that the errors in cutting are reduced to an absolute minimum.

Another object is to provide a photoelectric line follower containing optical means to invert an asymmetrical scanning pattern as seen by the photoelectric device to compensate for asymmetrical placing of the tool with respect to the line it is following.

A further object is to provide a line follower containing an improved means for producing an asymmetrical scanning pattern in combination with optical means to invert the pattern.

Broadly, the invention consists of a photoelectric line follower containing a light source for automatically following an outline on a substrate, in which the scanning pattern generated by the line follower and displayed on the substrate is asymmetrical with respect to the outline on the two sides of the outline, comprising optical means containing a plurality of movable reflecting surfaces, the reflecting surfaces being movable to a first position in which an odd number of reflecting surfaces is placed in the path of the light rays between the light source and the substrate and to a second position in which an even number of reflecting surfaces is placed in the path of the light rays between the light source and the substrate whereby the display of the scanning pattern with respect to the outline is inverted, the reflecting surfaces being so placed that the length of the path of the light rays between the light source and the substrate is the same whether the odd or the even number of reflecting surfaces is in use.

The invention will now be described with reference to the drawings accompanying the provisional specification in which—

FIGURE 1 shows diagrammatically an asymmetrical scanning pattern in a follower following an outline which turns to the left to form an outside corner, the tool operating on the right-hand side of the outline;

FIGURE 2 shows diagrammatically the same follower following an outline which turns to the right to form an inside or re-entrant corner;

FIGURE 3 shows diagrammatically an asymmetrical scanning pattern of a follower following an outline which turns to the left to form an inside or re-entrant corner, the tool operating on the left-hand side of the outline;

FIGURE 4 shows the arrangement of FIGURE 3 following an outline which turns to the right to form an outside corner;

FIGURE 5 shows diagrammatically the arrangement of a follower according to the invention; and FIGURE 6 shows the optical means used to secure the conditions illustrated in FIGURE 5.

Referring to FIGURE 1, there is shown an outline 11 which turns at right angles to the left at a point 12 to form an outside corner. This outline is being followed by a follower head having an asymmetrical scanning pattern 13, the direction of movement of the follower being in the direction of the arrow 14, the diagram showing the position when the scanning pattern 13 has just reached the corner 12. The outline 11 is drawn to the exact shape which it is desired to produce and since the tool, in this case the oxygen jet cutter, produces a cut of finite width it must be offset from the notional outline, as explained above. The tool is, of course, at a remote point of the machine from the follower but it is indicated in FIGURE 1 by the dotted circle 15, following its notional outline which is coincident with the outline 11. The width of the cut made by the jet flame is indicated by the dotted line 16. The material left, and forming the workpiece, is indicated by shading on one side of the outline.

In our aforementioned co-pending patent application a line follower is disclosed in which the scanning pattern is produced by generating a series of consecutive spots of light, each of which is formed on one side of the outline and is then caused to travel across the outline at an oblique angle, similar to the pattern 13, to the other side of the outline, at which it is extinguished. The spot travels from the upper right-hand corner to the lower left-hand corner of the pattern. The present invention is not limited to this kind of follower but it will be described in relation thereto. In this follower a timing impulse is generated either immediately prior to, or at the instant of formation of, each spot and an outline impulse is generated when the spot crosses the outline and the steering signal is generated by a variation in time intervals between an outline impulse and the preceding and succeeding timing impulses.

In FIGURE 1 the axis of the jet flame 15 is just short of the corner 12 when the scanning pattern 13 meets the corner. The further movement of the scanning pattern 13 over the outline causes the left-hand steering signal to be generated, the magnitude of the steering signal increasing as the portion 17 of the outline diverges more and more from the centre of the scanning pattern 13. As soon as the steering signal is delivered the follower head, and hence the scanning pattern 13, begin to steer to follow the corner and the jet flame 15 executes a corresponding manoeuvre. A certain amount of time is required for the steering motor to run up to speed and matters are so arranged that the scanning pattern 13 meets the corner 12 a little before the axis of the jet flame 15 has actually reached the corner 12. This provides cornering with a minimum of error.

FIGURE 2 shows the same follower, also moving in the direction indicated by the arrow 14, and having the same scanning pattern 13, which is approaching the corner 18, at which the outline turns to the right into the portion 19 to form an inside or re-entrant corner 18, the width of the cut again being indicated by the dotted line 16. In this case, due to the asymmetry of the scanning pattern 13, the right-hand end 20 of the scanning pattern first meets the portion 19 of the outline so that the time interval between the timing impulse substantially at the beginning of the scanning pattern and the outline impulse is very small indeed, and in consequence a maximum right-hand steering signal is delivered. It will be understood that a second outline impulse is delivered at the point 21 in the scanning pattern but the circuitry in the follower is so arranged that the second impulse is ignored. The maximum right-hand steering signal causes the follower (and the jet flame 15) to turn very quickly to keep substantially inside the portion 19 of the outline. It will be noted in FIGURE 2 that, in consequence of the asymmetry of the scanning pattern 13, the axis of the jet flame 15 is a comparatively long distance from the corner 18 when the maximum steering signal is generated, whereas in FIGURE 1 the axis of the jet flame is much closer to the corner 12 when a steering signal of gradually increasing magnitude is generated. The consequence of this asymmetrical operation, resulting from the asymmetrical scanning pattern, is that the errors in cornering are reduced to a minimum and are at the same time adjusted so that they are substantially the same for right-hand inside and left-hand outside corners.

FIGURE 3 shows an outline 11 which meets a portion 22 to form a left-hand internal or re-entrant corner. In this case the jet flame 15 is cutting on the left-hand side of its notional outline. A little consideration will show that if the scanning pattern 13 were employed in this case the asymmetry of the scanning pattern, instead of reducing the errors due to the asymmetrical placing of the tool with respect to the outline, would actually increase the errors and, for this reason, it is necessary to invert the arrangement of the scanning pattern 23 with respect to the placing of the jet flame 15, although the scanning pattern is still arranged that when following a straight line the outline crosses the centre of the scanning pattern. Each light spot is formed at the left-hand upper corner and moves downwardly to the right-hand lower corner of the pattern.

FIGURE 4 shows an outline 11 which meets a portion 24 to form a right-hand outside corner, with the jet flame 15 placed at the left-hand side of its notional outline, the scanning pattern 23 being the same as that shown in FIGURE 3.

The inversion of the placing of the scanning pattern and the tool may be carried out by mechanical means, but these are somewhat complex and the following description shows how the invention achieves the required inversion by optical means.

In the example of FIGURES 1 and 2 each scanning spot is first formed at the upper right-hand end of the scanning path, and it then moves downwardly and to the left across the outline, to be extinguished at the lower left-hand end of the scanning path.

One favoured method of producing the scanning spots is to provide a ring of holes in a rotating disc, and a mask, so arranged that the path of each spot is an arc of the ring. By suitable placing, a phototransistor may be arranged so that the spot of light passing through each hole in turn first strikes the phototransistor to produce the timing impulse, and immediately afterwards passes through the aperture in the mask to produce a scanning spot.

This arrangement (with the disc and phototransistor omitted) is shown in FIGURE 5 in which the arc swept by each spot is indicated by the arrowed arc 105. The axis of the disc lies on a centre line 101 and the axis of the jet flame 111 is in a position equivalent to lying on this axis. A sheet metal mask has a window 106 which allows each spot to form a curved path 107, which is transmitted through a Dove prism whose outline is indicated at 108. The mask containing the window 106 is provided with an index mark 109. In their operative positions, shown in FIGURE 5b, the parts are so orientated that the index 109 is at the left-hand side of the outline 110 and the scanning path 107 crosses the outline 110 at an angle of approximately 45°, the relative position of the jet flame 111 being indicated in dotted lines and the direction of spot movement by the arrow 112. This is for cutting with the work on the left-hand side of FIGURE 5b and corresponds to what is shown in FIGURES 1 and 2.

Assuming that the oxygen jet cutting machine has a co-ordinate drive system, a Synchro or Magslip resolver provides a sine/cosine signal for the two driving motors of the co-ordinate drive system. The windings of the resolver 73 are shown in FIGURE 5c, the two crossed rotor windings having connections 1, 2, 3 and 4 and the stator windings being marked X and Y, while the arrow 113 indicates the direction in which the steering signal is applied to that winding having connections 2 and 4. Steering is provided by rotating the Dove prism 108 instead of rotating the follower head itself, as is more usual.

For cutting on the other side of the outline the arrangements of the parts remains unchanged, as illustrated in FIGURE 5d and there is no necessity to reverse the direction of rotation of the motor, but the display is optically inverted so that it is as shown in FIGURE 5e. The manner in which it is inverted will be described in relation to FIGURE 6, and the effect is that the index 109 is now at the right-hand side of the outline 110, the jet flame 111 is operating at the left-hand side of the outline 110, the direction of follower movement is as shown by the arrow 112, which is precisely the same as in FIGURE 5b and the path of the scanning spots has been changed so that it is now as indicated by reference 114. In addition to inverting the display optically, the connections 2 and 4 to the one winding of the resolver are changed over so that the steering signal is applied to that winding in the direction of the arrow 115, as indicated in FIGURE 5f.

Since the display shown in FIGURE 5b has to be changed to its mirror image the most obvious way of reversing it is to insert a mirror, since any change which substitutes an even number for an odd number of reflections in the light path will give the required reversal. However, it is important that the display and the light source from which it is derived must remain in the same position and the light rays must arrive and leave in the same direction as before. Moreover, the total length of the light path must be unaltered, in order that there shall be no loss of focus.

As shown in FIGURE 6 this is achieved by very simple means according to the invention, without the use of refraction, and it comprises a block 123 formed with a single plane mirror surface 116 and formed with a "roof" pair of mirror surfaces 117 and 118 opposite the plane mirror 116. The block 123 is mounted so that it will rotate about an axis 119.

In one mode of operation shown in FIGURE 6a, light rays arriving along the paths 120, 121 and 122 are reflected by the plane mirror surface 116 to follow paths 120a, 121a and 122a. Similarly, light rays arriving along path 124 are reflected along path 125 while those arriving along path 126 are reflected along path 127. When the block 123 is rotated through 180°, as shown in FIGURE 6b, the light rays arriving along the paths 120, 121 and 122, in the plane of the junction of surfaces 117 and 118, are reflected as before. Light rays arriving along path 124 strike the surface 117, are reflected to surface 118 and leave by path 125, which is in the position previously occupied by path 127. Similarly rays arriving along path 126 strike surface 118, are reflected to surface 117 and leave by path 127, which is in the position previously occupied by path 125. In this way the image is inverted from side to side.

The block 123 is so formed that the length of the path of a light ray striking the surface 116 and being reflected is precisely the same as the length of the path of a ray striking the surface 117, being reflected to the surface 118, and then being reflected from the latter surface. This is arranged by appropriate spacing of the surface 116 and the surfaces 117 and 118 from the axis 119.

From the above description it will be clear that it is only necessary to insert this reflecting device in the path of the light beam in order to provide side to side inversion of the display. The only other requirement to provide a complete inversion of function is to reverse the connections to the one resolver winding, as previously mentioned, in order to change the mode of cutting, so that the special advantages of the invention may be obtained when cutting on either side of the outline.

I claim:

1. A photoelectric line follower for automatically following an outline on a substrate, means for generating a scanning pattern and displaying it on the substrate, the pattern being asymmetrical with respect to the outline on the two sides of the outline, comprising optical means containing a plurality of movable reflecting surfaces, the reflecting surfaces being movable to a first position in which an odd number of reflecting surfaces is placed in the path of the light rays between the light source and the substrate and to a second position in which an even number of reflecting surfaces is placed in the path of the light rays between the light source and the substrate whereby the display of the scanning pattern with respect to the outline is inverted, the first and second positions of the reflecting surfaces establishing the same path length of light rays between the light source and the substrate.

2. A line follower as claimed in claim 1 in which said optical means includes a mask containing a slit, a rotatable disc formed with a ring of holes adjacent said mask, said holes successively registering with said slit, a light source to project a beam of light through the holes of said ring and said slit so that a series of discrete scanning lines is formed, and a Dove prism, said scanning lines being projected through said Dove prism on to said outline at an angle thereto so as to form said asymmetrical scanning pattern.

3. A line follower as claimed in claim 1 in which said optical means comprises a block formed with a plane reflecting surface on one side and formed with a pair of reflecting surfaces at the side opposite said plane reflecting surface, said pair of reflecting surfaces being disposed at equal acute angles with respect to a median plane which is perpendicular to said plane reflecting surface, means mounting said block for rotation about an axis which lies in said median plane and is parallel to said plane reflecting surface, said plane reflecting surface and pair of reflecting surfaces being so spaced from said axis that the path of light rays striking said plane reflecting surface and being reflected therefrom is of equal length to the path of light rays striking one surface of said pair and being reflected to the other surface of said pair and then being reflected therefrom, said block being rotated about said axis from said first position through 180° to said second position to invert said image with respect to the outline.

4. A line follower as claimed in claim 3 in which the means to produce the said asymmetrical scanning pattern comprise a mask containing a slit, a rotatable disc formed with a ring of holes adjacent said mask, said holes successively registering with said slit, a light source to project a beam of light through the holes of said ring and said slit so that a series of discrete scanning lines is formed, and a Dove prism, said scanning lines being projected through said Dove prism on to said outline at an angle thereto so as to form said asymmetrical scanning pattern.

5. A line follower as claimed in claim 3 comprising a synchro resolver to resolve the direction of movement of said line follower into two voltages corresponding to coordinate directions in which motors are arranged to drive said line follower, and means to reverse the connections of one resolver winding when said image is inverted by rotating said block from said first position to said second position.

6. A photoelectric line follower for automatically following an outline on a substrate, in which the scanning pattern generated by the line follower and displayed on the substrate is asymmetrical with respect to the outline on the two sides of the outline comprising optical means to invert the image of the scanning pattern with respect to the outline as seen by the photoelectric device in the follower, said optical means including a block formed with a plane reflecting surface on one side and formed with a pair of reflecting surfaces at the side opposite said one plane reflecting surface, said pair of reflecting surfaces being disposed at equal acute angles with respect to a median plane which is perpendicular to said plane reflecting surface, means mounting said block for rotation about an axis which lies in said median plane and is parallel to said plane reflecting surface, said plane reflecting surface and pair of reflecting surfaces being so spaced from said axis that the path of light rays striking said plane reflecting surface and being reflected therefrom is of equal length to the path of light rays striking one surface of said pair and being reflected to the other surface of said pair and then being reflected from said other surface, means to rotate said block about said axis to invert said image, a synchro resolver to resolve the direction of movement of said line follower into two voltages corresponding to co-ordinate directions in which motors are arranged to drive said line follower, and means to reverse the connections of one resolver winding when said image is inverted by rotating said block from one position to the other, said asymmetrical scanning pattern being produced by a mask containing a slit, a rotatable disc formed with a ring of holes adjacent said mask, said holes successively registering with said slit, a light source to project a beam of light through the holes of said ring and said slit so that a series of discrete scanning lines is formed, and a Dove prism, said scanning lines being projected through said Dove prism on to said outline at an angle thereto so as to form said asymmetrical scanning pattern.

7. In a line follower system including a substrate having an outline, a cutting tool having a finite width of cut, optical means movable along the path of the outline first in a generally forward direction and then to return in the generally opposite direction for generating a scanning pattern, and means slowing said cutting tool to follow the movement of said optical means but in laterally offset relation thereto so as to accommodate for said finite width of cut and so to substantially duplicate, in a workpiece, said outline of the substrate, the improvement comprising, means for displaying said scanning pattern to cross said outline in a direction which is oblique to the path of the outline as the cutting tool is moved in said forward general direction, and means for inverting the scanning pattern display as the cutting tool is moved in said opposite general direction.

References Cited

UNITED STATES PATENTS

| | | | |
|---|---|---|---|
| 3,128,383 | 4/1964 | Brouwer et al. | 250—202 |
| 3,268,731 | 8/1966 | Brouwer et al. | 250—202 |

RALPH G. NILSON, *Primary Examiner.*

M. ABRAMSON, *Assistant Examiner.*